Jan. 16, 1945. J. L. BOLAND 2,367,560
REAMER
Filed Dec. 19, 1942
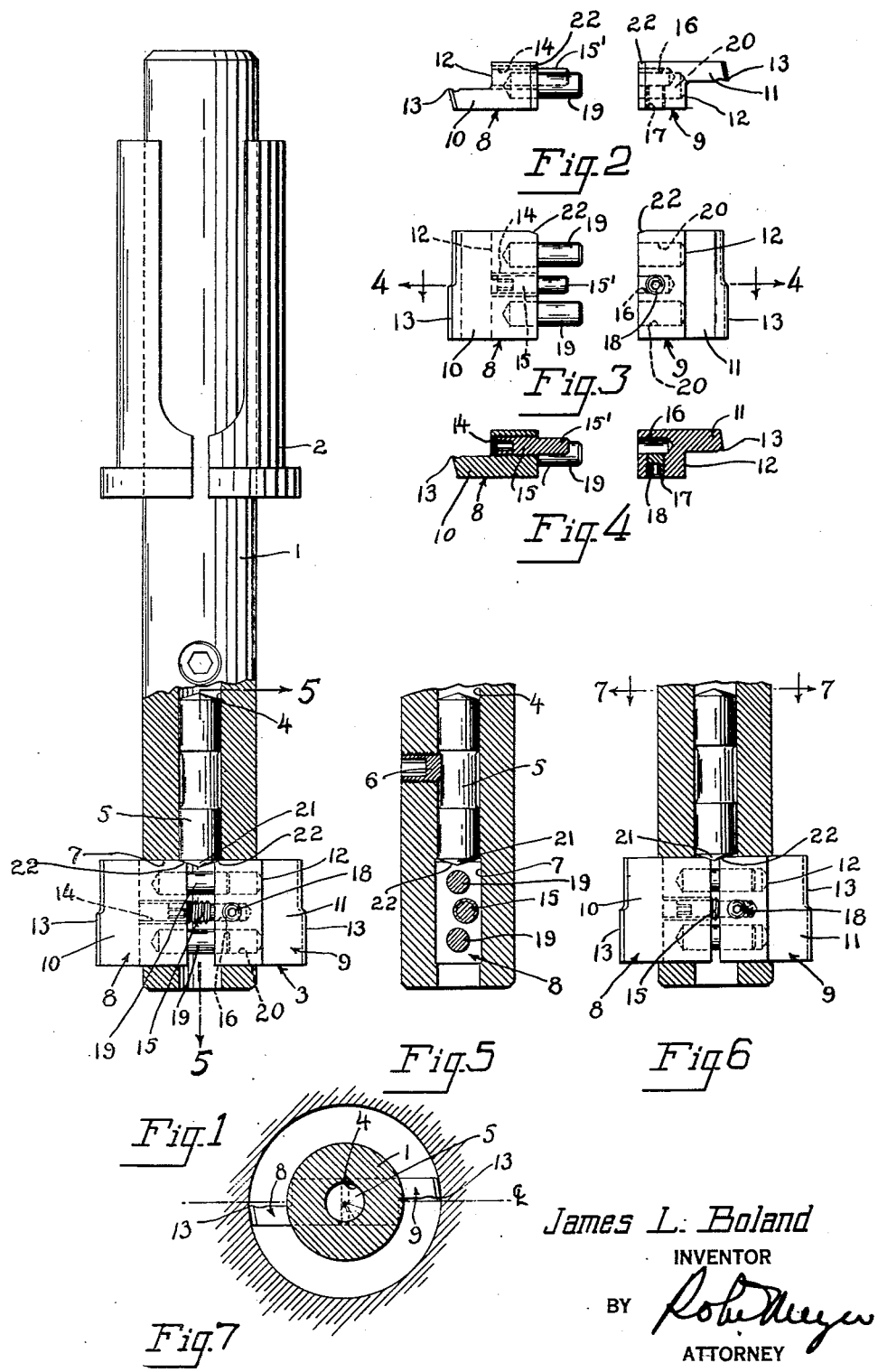
James L. Boland
INVENTOR Patented Jan. 16, 1945

2,367,560

UNITED STATES PATENT OFFICE 2,367,560

REAMER

James L. Boland, Avenel, N. J.

Application December 19, 1942, Serial No. 469,518

3 Claims. (Cl. 77—58)

This invention relates to reaming tools and more particularly to a reamer bit or cutter for use in such tools.

An object of the present invention is the provision of an adjustable reamer bit or cutter for use in a reaming tool, adjustable to a variety of sizes within certain predetermined limits. Due to the construction of the reamer bit of the present invention, it will always remain accurately centered when in use, irrespective of the size to which it is adjusted. In adjustable reamer bits of the type now in use, accurate centering is possible only when the bit is adjusted to a very limited number of sizes, requiring the use of as many as five such reamers of varying sizes for the same work that one reamer of the present improved type can successfully accomplish. A marked economy in reaming operations is thus effected through the use of the present bit.

A further object of the present invention is the provision of a reamer bit so constructed and arranged as to permit accurate, positive adjustment of the cutting edges relative to each other in increments of extremely small fractions of an inch, even to a thousandth, providing a maximum degree of accuracy in reaming operations. The rugged construction of my reamer bit also guarantees extreme rigidity and positive, accurate adjustment, throughout its range of adjustment, regardless of the strain placed upon it and without sacrificing simplicity and economy of manufacture. Due to the simple construction and rugged strength of my improved reamer bit, the frequent repairs and complete replacements encountered when using the bits now available, caused by stripped threads, sprained parts, etc., are done away with. When only one part or segment of a reamer constructed in accordance with my invention breaks or becomes too worn for further use, a corresponding part of a similar size reamer of the same type may be substituted. This interchangeability of parts or segments reduces expense and eliminates waste, through the saving of time and the expense of a complete new reamer bit, and the salvage of the still usable part. Further, only one small set screw wrench is necessary for both adjustment and tightening of the reamer bit, whereas in other types now in use two or more tools are required for the same purposes. Although the construction of the reamer bit or cutting tool is such that it is always accurately centered while in use, at the same time it is so held in the reamer bar as to provide sufficient freedom therein to allow the very small floating action necessary in proper reaming operations without effect upon its proper centering or any decrease in the accuracy of the reaming action.

A further object of the present invention is the provision of a reamer or cutting tool having its cutting edges offset a fraction of an inch on opposite sides of the center of the opening being reamed, permitting more efficient lubrication and the use of a water compound for this purpose, resulting in a better finish of the reamed holes. The bit construction and resultant greater strength and rigidity of the reamer or cutting tool of the present invention permits greater speeds of revolution and rates of feeding than the usual accepted speeds of feed and revolution permissible with the type of tool presently in general use.

With these and other objects in view, as may appear from the accompanying specification, the invention consists of various features of construction and combination of parts, which will be first described in connection with the accompanying drawing, showing a reamer of the preferred form embodying the invention, and the features forming the invention will be specifically pointed out in the claims.

In the drawing:

Figure 1 is a view of a reamer bar of the usual type, partly in cross-section, having inserted therein a reamer bit constructed in accordance with the present invention.

Figure 2 is a top elevation of the reamer tool shown in Figure 1, having its two segments separated.

Figure 3 is a side elevation of the reamer tool shown in Figure 1 having its two segments separated.

Figure 4 is a cross-section through the reamer tool on the line 4—4 of Figure 3.

Figure 5 is a cross-section taken on the line 5—5 of Figure 1.

Figure 6 is a sectional view of a part of the reamer bar as shown in Figure 1, showing the reamer bit or tool adjusted to a smaller diameter than is shown in Figure 1.

Figure 7 is a section on the line 7—7 of Figure 6, showing the position of the cutting edges of the reamer bit with relation to the center line of the hole being reamed.

Referring more particularly to the drawing, in Figure 1 a reamer bar 1 and a bushing 2 are shown, being of any approved type generally used and on the market, adapted to be used with a reamer tool or bit 3 of the type comprehended by the present invention. The reamer bar 1 has an axial bore 4 longitudinally of its body in which is placed a locating pin 5. This locating pin 5 is movable longitudinally of the bore 4 and is locked in position by means of a set screw 6, and contacts the upper surface of the cutting tool or bit 3 for centering the same, as will be hereinafter described.

The cutting tool or bit 3 fits into an opening 7 cut through the reamer bar 1 at right angles to its axis, the vertical centerline of which opening bisects the axis of the bar 1. When the cutting tool or reamer bit 3 is in position in the opening 7 of the bar 1, the pin 5 is dropped into contact with the upper surface of the tool 3 and is then locked in place by means of the set screw 6, holding the bit or tool 3 firmly in place and centered.

The cutting tool 3 is formed in two sections or segments, as indicated by the numerals 8 and 9 respectively, each of which sections has cutting edges 13 formed on its outer end. The inner portions of the sections 8 and 9 are of a uniform thickness and width. The outer portions 10 and 11 thereof, which extend beyond the periphery of the reamer bar 1, are of a reduced thickness and a shoulder 12 is thus formed by the junction of the two portions of each section. These outer ends or portions 10 and 11 are slightly less than one-half the thickness of the main body portions of the sections or segments and the cutting edges 13 are formed on their extremities at an obtuse angle (approximately 6°) to the face of the section. The cutting edges are thus a fraction of an inch on opposite sides of the center of the hole being reamed as clearly shown in Figure 7 of the drawing, whereas in the reamers for analogous uses now on the market the cutting edges are on the center-line of the hole being reamed. This construction permits better lubrication of the reamer and the use of a water compound lubricator for the purpose, giving a better finish to the reamed holes.

A threaded bore 14 is formed in the main body of the section 8, extending from the shoulder 12 through to the inner face of the section. An adjusting screw 15 is threaded through this bore 14 and its outer end enters a corresponding bore 16 formed in the section or segment 9. The bore 16 is not threaded and is of sufficiently larger diameter than the end of the screw 15 to allow free longitudinal movement of the latter therein. It is preferable that the end 15' of the adjusting screw 15 which extends into the bore 16 be smooth or free from threads. A threaded bore 17 is formed in the section or segment 9, intersecting the bore 16, and receives therein a locking set screw 18 for the purpose of locking the screw 15 in place within the bore 16 and thus locking the segments 8 and 9 at a predetermined degree of relative adjustment.

Dowel pins 19 are sweat-fitted or shrunk into bores formed in the section 8 and they extend a predetermined distance beyond the inner face. These extensions of the dowel pins 19 are slidably inserted into corresponding bores 20 in the segment 9. Thus, when the two sections are put together to form a unit, the dowels 19 snugly slide into the bores 20, the set screw 15 is adjusted in its threaded bore 14 with its outer end inserted in the bore 16, the respective sections 8 and 9 are adjusted to their desired position and the locking set screw 18 tightened against the end of the set screw 15, locking the two sections together in adjusted position to form a solid unit. The size of the dowels 19 and their snug fit in the bores 20 provides an extremely rigid, strong union or correlation of the two sections or segments 8 and 9, forming one solid reamer tool or bit.

The firm, sturdy and adjustable connection provided between the sections 8 and 9 through the medium of the dowel pins 19 and the adjusting pin 15, all of which are embedded in the solid body or heavier part of the bit sections 8 and 9 permits firm, steady and accurate relative adjustment of the sections relative to each other. The threads on the threaded portion of the adjusting screw 15 are of sufficiently fine pitch to permit relative adjustment of the sections to permit variations of as little as one thousandth of an inch in the distance between the cutting edges 13 to provide maximum accuracy in reaming operations of the tool, and yet to permit relative adjustment of the sections through a comparatively wide range between maximum and minimum adjusted positions without effecting the rigidity of the tool or bit as a whole; and permitting the cutting edges to be adjusted through a cutting range equal to the cutting range provided by five or more analogous tools now accepted by and available to the trade.

The angle of junction between the upper or top edges of the sections 8 and 9 and the inner confronting edges thereof are bevelled as shown at 22 preferably at an angle of approximately 18° to the plane of the top surface or to correspond to the bevel of the outer end of the locating pin 4. These bevelled surfaces 22 cooperate with the cone shaped end of the locating pin 5 which has this same angle of inclination. Thus the cone or bevelled end 21 of the pin 5 engaging the bevelled surfaces 22 of the rigidly joined sections 8 and 9 automatically and accurately centers the unit 3 in the reamer bar 1. The ends 10 and 11 of the unit 3 are thereby extended an uniformly equal distance beyond the perimeter of the reamer bar 1. Regardless of the size to which the reamer tool is adjusted the above described construction guarantees perfect centering at all times.

The bores 20 in the section 9 are drilled through and open to shoulder 12 of the section 9 allowing the bores to be cleaned by blowing air therethrough and preventing accumulation of dirt, etc., that might impair the efficiency of the tool.

It will be understood that the invention is not to be limited to the specific construction or arrangement of parts shown, but that they may be widely modified within the invention defined by the claims.

What is claimed is:

1. In a boring or reaming tool, in combination with a reamer bar having a longitudinal bore and a transverse bit receiving opening near one end thereof, of a bit comprising a pair of independently movable sections having cutting edges on their outer ends, and adjusting screw adjustably carried by one of said bit sections, the other of said bit sections provided with a recess for slidably receiving said adjusting screw in abutting engagement for varying the distance between the cutting edges of the bit sections upon adjustment of the adjustment screw, and releasable locking means carried by said recessed section and engaging said adjusting screw for locking the sections in adjusted positions.

2. In a boring or reaming tool, in combination with a reamer bar having a longitudinal bore and a transverse bit receiving opening near one end thereof, of a bit comprising a pair of independently movable sections having cutting edges on their outer ends, and adjusting screw adjustably carried by one of said bit sections, the other of said bit sections provided with a recess for slidably receiving said adjusting screw in abutting engagement for varying the distance between the cutting edges of the bit sections upon adjustment of the adjustment screw, releasable locking means carried by said recessed section and engaging said adjusting screw for locking the sections in adjusted positions, a locating pin slidably carried by said reamer bar, each of said bit sections provided with surfaces co-operating with each other and with said locating pin for positively and accurately centering the bit in the reamer bar after the sections have been locked in adjusted positions.

3. In a boring or reaming tool, in combination with a reamer bar having a longitudinal bore and a transverse bit receiving opening near one end thereof, of a bit comprising a pair of independently movable sections having cutting edges on their outer ends, and adjusting screw adjustably carried by one of said bit sections, the other of said bit sections provided with a recess for slidably receiving said adjusting screw in abutting engagement for varying the distance between the cutting edges of the bit sections upon adjustment of the adjustment screw, releasable locking means carried by said recessed section and engaging said adjusting screw for locking the sections in adjusted positions, a locating pin slidably carried by said reamer bar, said locating pin having a cone shaped end, each of said bit sections having their upper corners at their facing ends bevelled to conform to the taper of the cone shaped end of said locating pin whereby the cone shaped end of the locating pin co-operating with said bevelled surfaces will positively and accurately center the bit in the reamer bar after the bit sections have been locked in adjusted positions.

JAMES L. BOLAND.